US012259665B2

(12) United States Patent
Kawasaki et al.

(10) Patent No.: US 12,259,665 B2
(45) Date of Patent: Mar. 25, 2025

(54) OPTICAL SCANNING DEVICE AND IMAGE FORMING APPARATUS INCLUDING THE SAME

(71) Applicant: KYOCERA Document Solutions Inc., Osaka (JP)

(72) Inventors: Kenichiro Kawasaki, Osaka (JP); Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/364,243

(22) Filed: Aug. 2, 2023

(65) Prior Publication Data

US 2024/0045354 A1 Feb. 8, 2024

(30) Foreign Application Priority Data

Aug. 8, 2022 (JP) ................................ 2022-126450

(51) Int. Cl.
*G03G 21/00* (2006.01)
*G03G 15/02* (2006.01)

(52) U.S. Cl.
CPC ................................ *G03G 15/0258* (2013.01)

(58) Field of Classification Search
CPC ............... G03G 15/0258; G03G 15/04; G03G 15/04045; G03G 15/043; G03G 21/00; G03G 21/169; H04N 1/00909
See application file for complete search history.

(56) References Cited

U.S. PATENT DOCUMENTS

2021/0382408 A1* 12/2021 Yoshida ............ G03G 15/0409

FOREIGN PATENT DOCUMENTS

JP 2009-143108 A 7/2009

* cited by examiner

*Primary Examiner* — Hoang X Ngo
(74) *Attorney, Agent, or Firm* — Stein IP, LLC

(57) ABSTRACT

An optical scanning device irradiates an image carrier with laser light to form an electrostatic latent image. The optical scanning device includes a casing, a transmissive member, a wire-shaped member, a driving portion, a guide rail, a cleaning holder, a cleaning member, and a stopper. The cleaning member is fixed to the cleaning holder and cleans the transmissive member by sliding with respect to the transmissive member along with movement of the cleaning holder. The stopper is disposed on one side of the guide rail in an extending direction of the guide rail and restricts the movement of the cleaning holder. Another side of the guide rail in the extending direction of the guide rail is open in the extending direction of the guide rail.

6 Claims, 11 Drawing Sheets

OPTICAL SCANNING DEVICE AND IMAGE FORMING APPARATUS INCLUDING THE SAME

INCORPORATION BY REFERENCE

This application is based upon and claims the benefit of priority from the corresponding Japanese Patent Application No. 2022-126450 filed on Aug. 8, 2022, the entire contents of which are incorporated herein by reference.

BACKGROUND

Field of the Invention

The present disclosure relates to an optical scanning device that irradiates an image carrier with light to form an electrostatic latent image on the image carrier in an electrophotographic image forming apparatus, and also relates to an image forming apparatus including the optical scanning device.

Description of the Related Art

A conventional optical scanning device irradiates a charged image carrier with light, and thereby forms an electrostatic latent image on the image carrier. The optical scanning device includes a casing, a transmissive member, a spiral member, a guide rail, a cleaning holder, and a cleaning member.

In the casing, an emission port for laser light with which to irradiate the image carrier is formed to extend in the main scanning direction of the laser light. The transmissive member extends in the main scanning direction of the laser light, and also seals the emission port for the laser light. The spiral member extends in the extending direction of the transmissive member. The guide rail is disposed side by side with the emission port so as to extend in the extending direction of the transmissive member. The cleaning holder is caused, by the rotation of the spiral member, to move along the guide rail. The cleaning member is fixed to the cleaning holder, and slides with respect to the transmissive member along with the movement of the cleaning holder, thereby cleaning the transmissive member.

In a case where the conventional technology is adopted, it takes trouble to incorporate the cleaning holder in the spiral member, resulting in disadvantageously poor assembly workability.

SUMMARY

According to one aspect of the present disclosure, an optical scanning device irradiates an image carrier with laser light to form an electrostatic latent image on the image carrier. The optical scanning device includes a casing, a transmissive member, a wire-shaped member, a driving portion, a guide rail, a cleaning holder, a cleaning member, and a stopper. The casing has an emission port for laser light formed therein to extend in a main scanning direction of the laser light so as to correspond to the image carrier. The transmissive member has transmissivity with respect to the laser light, extends in the main scanning direction of the laser light, and seals the emission port for the laser light. The wire-shaped member is stretched in a loop in the casing. The driving portion causes the wire-shaped member to run in a first direction and in a second direction. The guide rail is disposed side by side with the emission port so as to extend in an extending direction of the transmissive member. The cleaning holder is fixed to the wire-shaped member and moves along the guide rail when the wire-shaped member is caused to run in a loop by the driving portion. The cleaning member is fixed to the cleaning holder and cleans the transmissive member by sliding with respect to the transmissive member along with movement of the cleaning holder. The stopper is disposed on one side of the guide rail in an extending direction of the guide rail and restricts the movement of the cleaning holder. Here, an other side of the guide rail in the extending direction of the guide rail is open in the extending direction of the guide rail.

This and other objects of the present disclosure, and the specific benefits obtained according to the present disclosure, will become apparent from the description of embodiments which follows.

DETAILED DESCRIPTION

Figure 1:
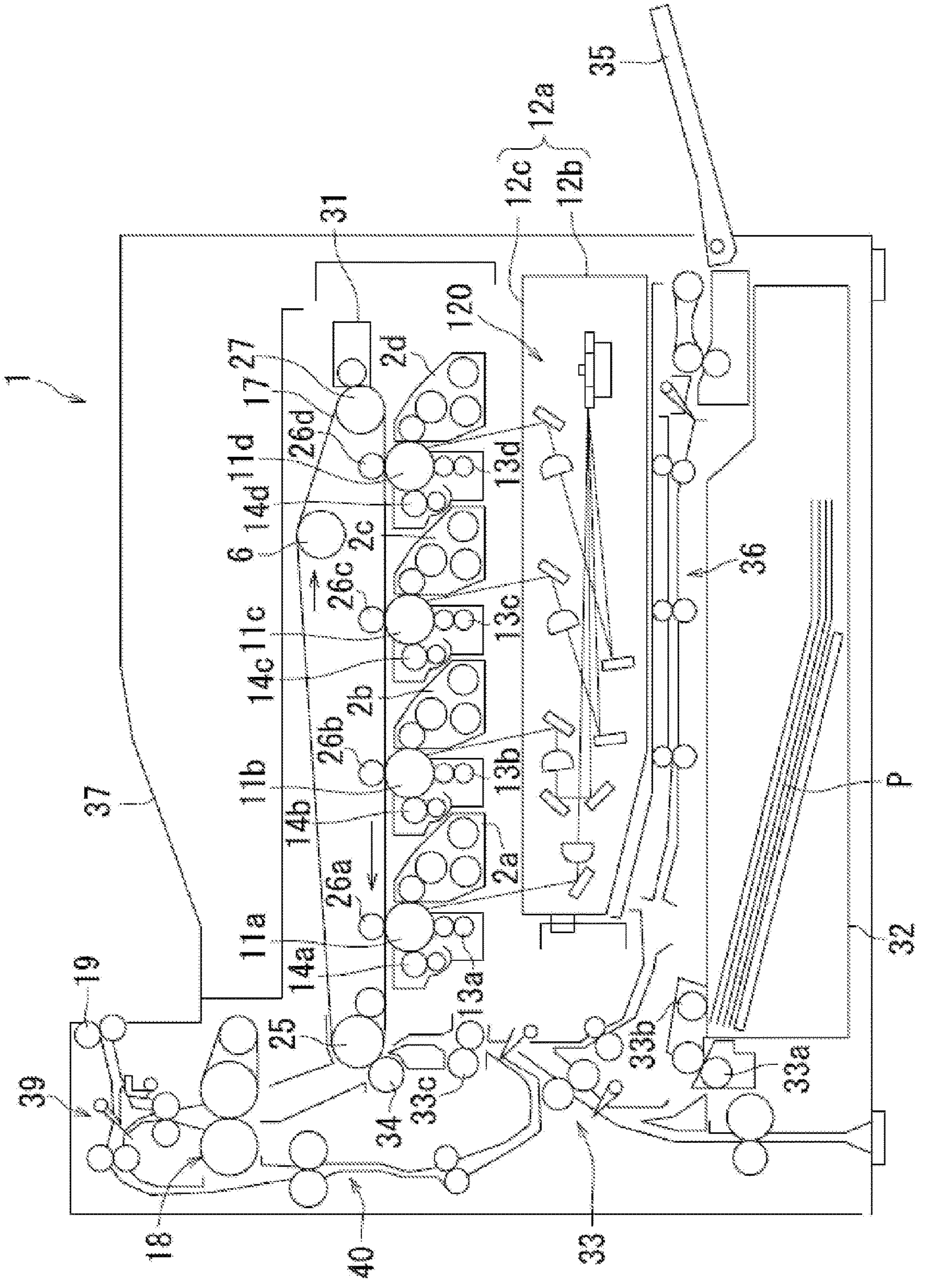
FIG. 1 is a sectional view schematically showing an overall configuration of an image forming apparatus 1 incorporating an optical scanning device 12 of the present disclosure.

Hereinafter, an embodiment of the present disclosure will be described with reference to the accompanying drawings. FIG. 1 is a sectional view schematically showing an overall configuration of an image forming apparatus 1 incorporating an optical scanning device 12 of the present disclosure. The image forming apparatus 1 is a tandem-type color printer. The image forming apparatus 1 includes photosensitive drums 11*a* to 11*d*, which are rotatable, as image carriers. The photosensitive drums 11*a* to 11*d* are each formed of, for example, an organic photosensitive member (an OPC photosensitive member) on which an organic photosensitive layer is formed, or an amorphous silicon photosensitive member on which an amorphous silicon photosensitive layer is formed. The photosensitive drums 11a to 11d are disposed in a tandem manner corresponding to colors of magenta, cyan, yellow, and black.

Around the photosensitive drum 11a, there are arranged a developing device 2a, a charger 13a, and a cleaning device 14a. Likewise, around each of the photosensitive drums 11ba to 11d, there are arranged a corresponding one of developing devices 2b to 2d, a corresponding one of chargers 13b to 13d, and a corresponding one of cleaning devices 14b to 14d. Further, below the developing devices 2a to 2d, there is arranged an optical scanning device 12.

The developing devices 2a to 2d are each disposed on a right side of the corresponding one of the photosensitive drums 11a to 11d. The developing devices 2a to 2d are each disposed so as to be opposed to the corresponding one of the photosensitive drums 11a to 11d, and each supply toner to the corresponding one of the photosensitive drums 11a to 11d.

Herein, the terms “right” and “left” respectively refer to right and left in the drawings.

The chargers 13a to 13d are each disposed upstream of the corresponding one of the developing devices 2a to 2d with respect to a rotation direction of the corresponding one of the photosensitive drums 11a to 11d, and are each opposed to a surface of the corresponding one of the photosensitive drums 11a to 11d. The chargers 13a to 13d each uniformly charge the surface of the corresponding one of the photosensitive drums 11a to 11d.

Based on image data such as letters and patterns fed from a personal computer or the like to an image input portion, the optical scanning device 12 irradiates, with light (optically scans), the surfaces of the photosensitive drums 11a to 11d having been uniformly charged by the chargers 13a to 13d, and thereby forms electrostatic latent images on the surfaces of the photosensitive drums 11a to 11d.

The optical scanning device 12 has a casing 12a that includes a housing portion 12b having an opening in one surface thereof and a cover portion 12c that covers the opening. The housing portion 12b incorporates therein a scanning optical system 120. The cover portion 12c has formed therein emission ports 12d (see FIG. 5) for light (laser light) emitted from the scanning optical system 120, each of the emission ports 12d corresponding to one of the photosensitive drums 11a to 11d. Furthermore, as will be described later, the emission ports 12d are each covered with a transmissive member 52. The transmissive member 52 has transmissivity with respect to the light emitted from the scanning optical system 120.

The scanning optical system 120 includes a laser light source (not shown) and a polygon mirror. The scanning optical system 120 further includes at least one reflection mirror and a lens corresponding to each of the photosensitive drums 11a to 11d. The laser light emitted from the laser light source is applied, via the polygon mirror, the reflection mirrors, and the lenses, to the surface of each of the photosensitive drums 11a to 11d from a downstream side of a corresponding one of the chargers 13a to 13d with respect to the rotation direction of the corresponding one of the photosensitive drums 11a to 11d. Thereby, electrostatic latent images are formed on the surfaces of the photosensitive drums 11a to 11d. These electrostatic latent images are developed into toner images by the developing devices 2a to 2d.

An intermediate transfer belt 17, which is an endless belt, is stretched between a tension roller 6, a driving roller 25, and a driven roller 27. The driving roller 25 is caused by a motor (not shown) to rotate, and thereby drives the intermediate transfer belt 17 to circulate in a clockwise direction in FIG. 1.

The photosensitive drums 11a to 11d are arrayed below the intermediate transfer belt 17 so as to be adjacent to each other along a conveyance direction (an arrow direction in FIG. 1). The photosensitive drums 11a to 11d are in contact with the intermediate transfer belt 17. Primary transfer rollers 26a to 26d are each opposed to a corresponding one of the photosensitive drums 11a to 11d via the intermediate transfer belt 17. The primary transfer rollers 26a to 26d are pressed against the intermediate transfer belt 17 and form, together with the photosensitive drums 11a to 11d, primary transfer portions. In these primary transfer portions, the toner images are transferred to the intermediate transfer belt 17. Specifically, a primary transfer voltage is applied to each of the primary transfer rollers 26a to 26d, and thereby the toner images on the photosensitive drums 11a to 11d are sequentially transferred onto the intermediate transfer belt 17 with predetermined timing. In this manner, on a surface of the intermediate transfer belt 17, a full-color toner image is formed in which the toner images of the four colors of magenta, cyan, yellow, and black are superimposed on each other in a predetermined positional relationship.

A secondary transfer roller 34 is opposed to the driving roller 25 via the intermediate transfer belt 17. The secondary transfer roller 34 is pressed against the intermediate transfer belt 17 and forms, together with the driving roller 25, a secondary transfer portion. In this secondary transfer portion, a secondary transfer voltage is applied to the secondary transfer roller 34, and thereby the toner image on the surface of the intermediate transfer belt 17 is transferred onto a sheet P. After this transfer of the toner image, a bet cleaning device 31 cleans residual toner off the intermediate transfer belt 17.

A sheet feed cassette 32 is arranged in a lower part of the image forming apparatus 1. The sheet feed cassette 32 accommodates a plurality of sheets P. On a right side of the sheet feed cassette 32, there is arranged a stack tray 35 for manual sheet feeding. On a left side of the sheet feed cassette 32, a first sheet conveyance path 33 is arranged. The first sheet conveyance path 33 conveys a sheet P fed out from the sheet feed cassette 32 to the secondary transfer portion. Further, a second sheet conveyance path 36 is arranged on a left side of the stack tray 35. The second sheet conveyance path 36 conveys a sheet P fed out from the stack tray 35 to the secondary transfer portion. Moreover, a fixing portion 18 and a third sheet conveyance path 39 are arranged in an upper left part of the image forming apparatus 1. The fixing portion 18 performs a fixing process with respect to a sheet P having an image formed thereon. The third sheet conveyance path 39 conveys the sheet P having undergone the fixing process to a sheet discharge portion 37.

Sheets P stacked in the paper feed cassette 32 is fed out one by one by a pick-up roller 33b and a pair of separation rollers 33a toward the first sheet conveyance path 33.

The first sheet conveyance path 33 and the second sheet conveyance path 36 join together before reaching a pair of registration rollers 33c (on an upstream side thereof). The pair of registration rollers 33c covey a sheet P toward the secondary transfer portion with timing coordinated with an image forming operation performed on the secondary transfer belt 17 and the sheet feeding operation to the secondary transfer portion. With respect to the sheet P having been conveyed to the secondary transfer portion, by the secondary transfer roller 34 to which the secondary transfer voltage has been applied, the full-color toner image, which has been formed on the intermediate transfer belt 17, is secondarily transferred. The sheet P having the full-color toner image transferred thereon is conveyed to the fixing portion 18.

The fixing portion 18 includes a fixing belt that is heated by a heater, a fixing roller that is internally in contact with the fixing belt, a pressing roller that is pressed against the fixing roller via the fixing belt, etc. The fixing portion 18 applies heat and pressure to the sheet P having the toner image transferred thereon. In this manner, the fixing process is carried out. The sheet P having the toner image fixed thereon in the fixing portion 18 is turned upside down, as necessary, through a fourth sheet conveyance path 40. Thereafter, the sheet P is conveyed again to the secondary transfer portion via the pair of registration rollers 33*c*, and then a new toner image is secondarily transferred onto the back side of the sheet P by the secondary transfer roller 34, and is fixed in the fixing portion 18. The sheet P having the toner image fixed thereon passes through the third sheet conveyance path 39 to be discharged by a pair of discharge rollers 19 into the sheet discharge portion 37.

Figure 2:
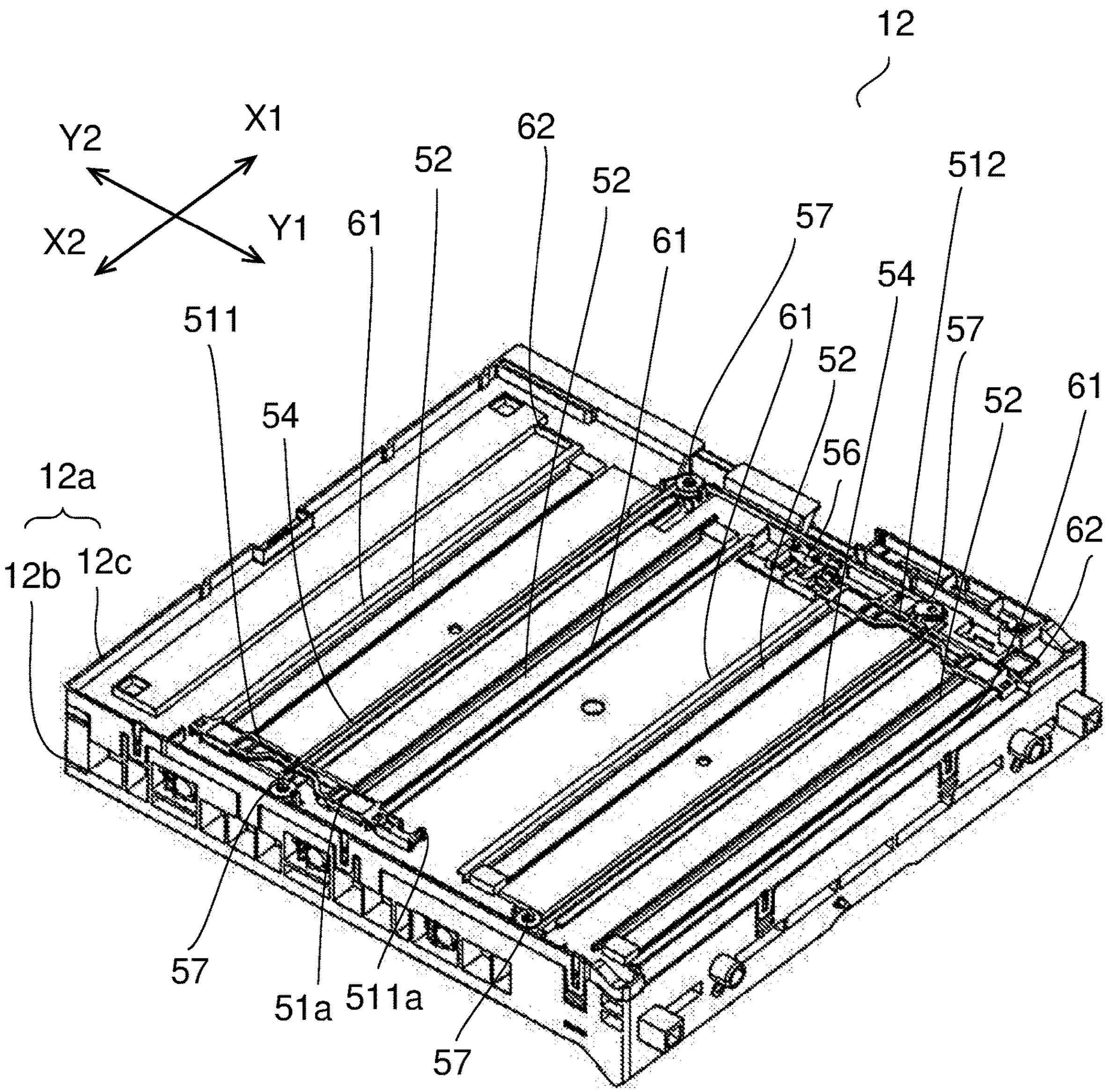
FIG. 2 is a perspective view of an optical scanning device 12 according to one embodiment of the present disclosure.
Figure 3:
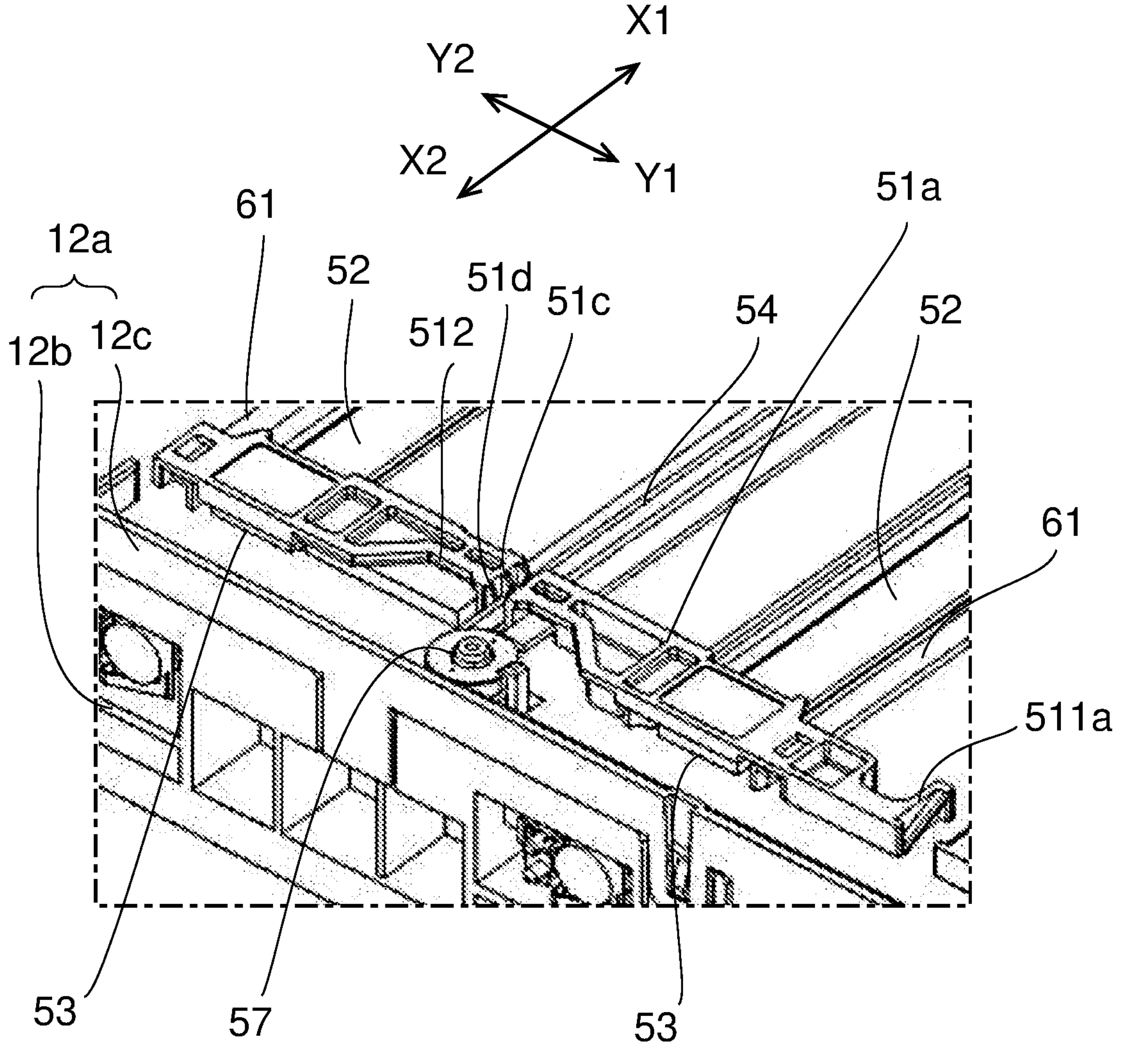
FIG. 3 is a perspective view showing, in an enlarged manner, part of an optical scanning device 12 according to one embodiment of the present disclosure.
Figure 4:
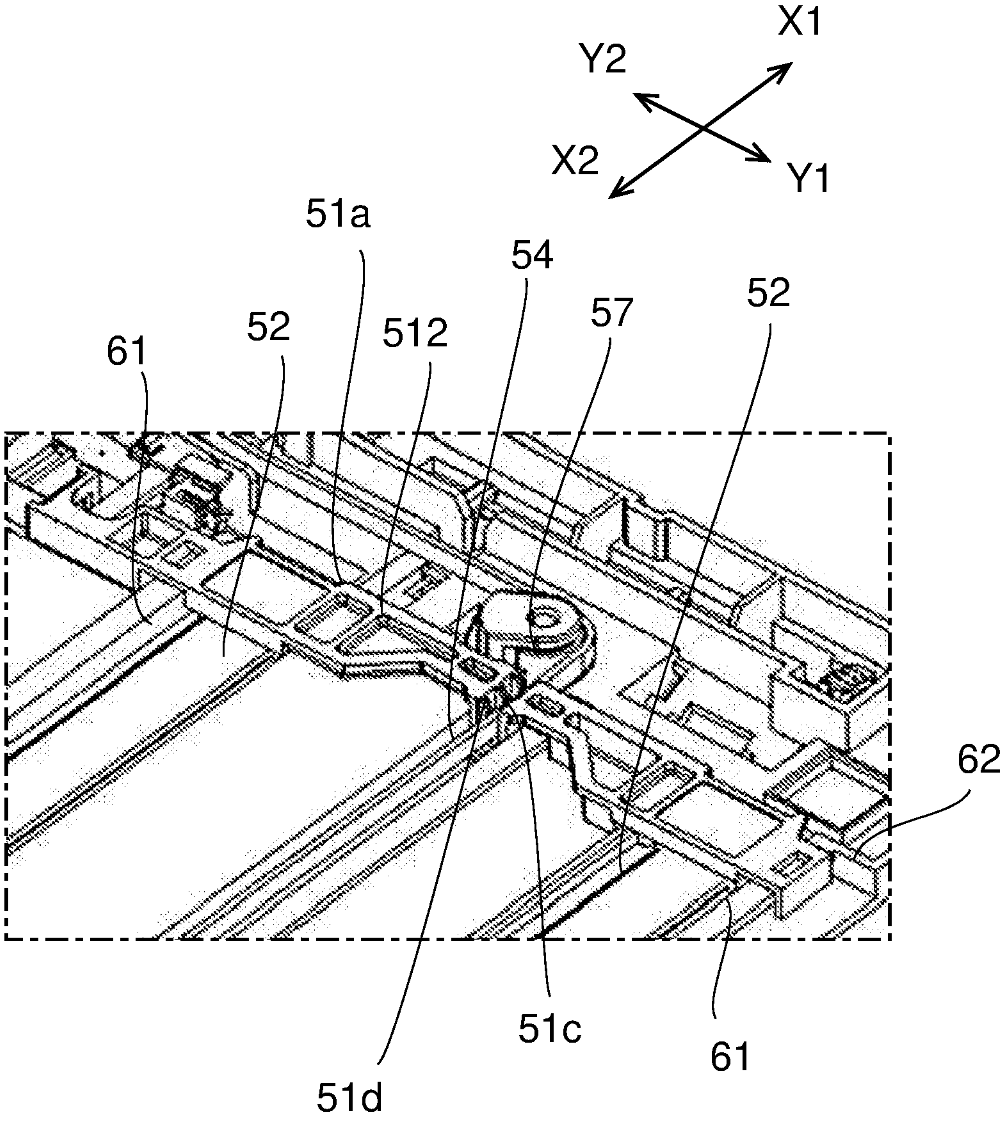
FIG. 4 is a perspective view showing, in an enlarged manner, part of an optical scanning device 12 according to one embodiment of the present disclosure.
Figure 5:
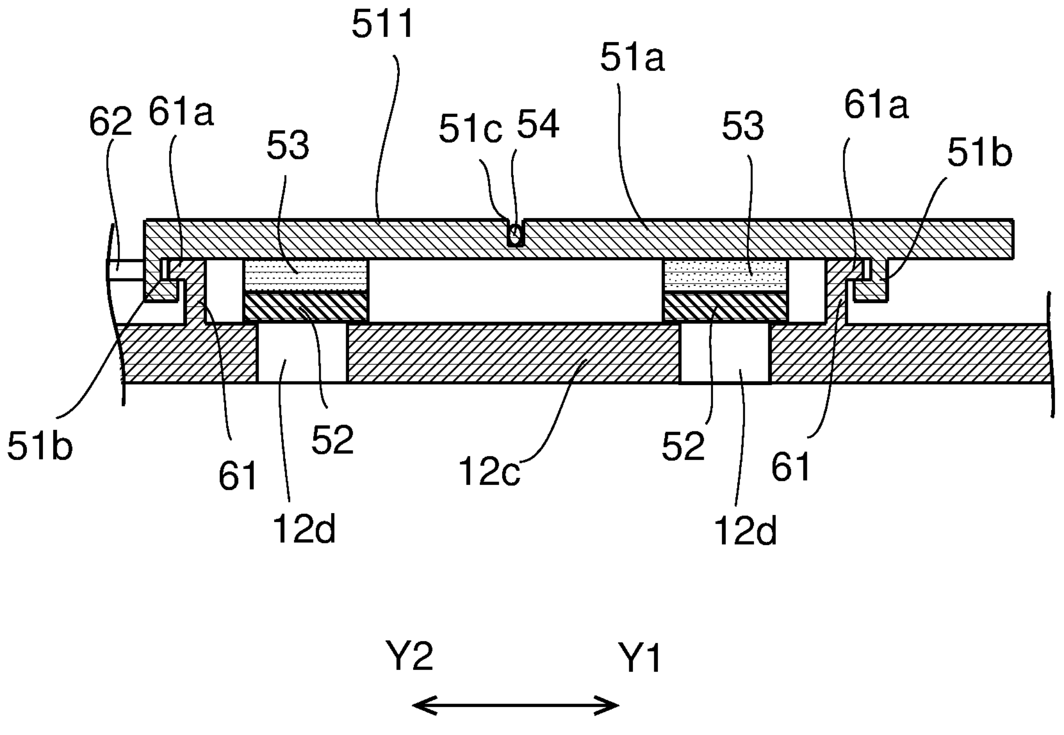
FIG. 5 is a sectional view schematically showing part of an optical scanning device 12 according to one embodiment of the present disclosure, as seen from a movement direction of a cleaning holder 511.
Figure 6:
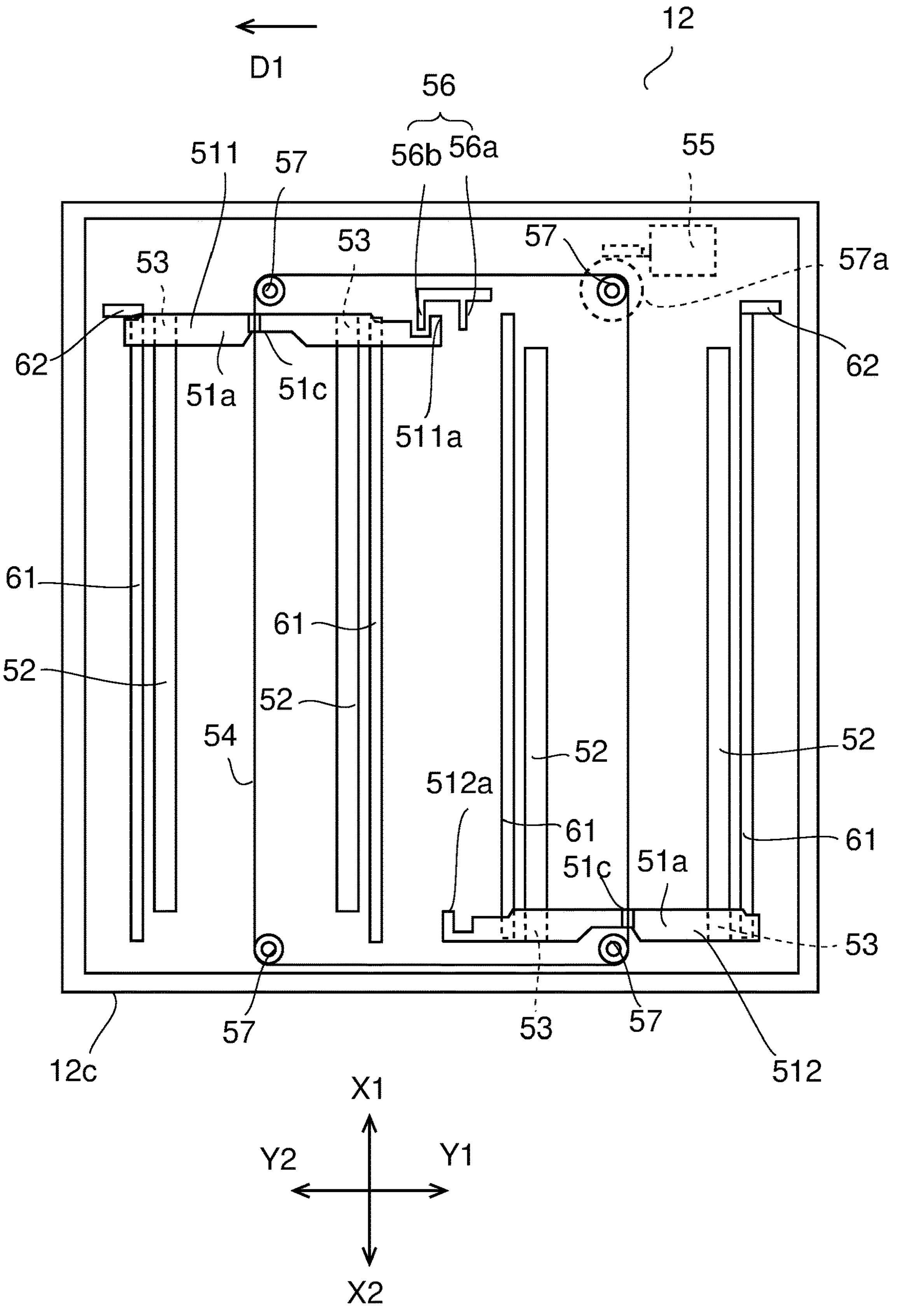
FIG. 6 is a plan view schematically showing an optical scanning device 12 according to one embodiment of the present disclosure.
Figure 7:
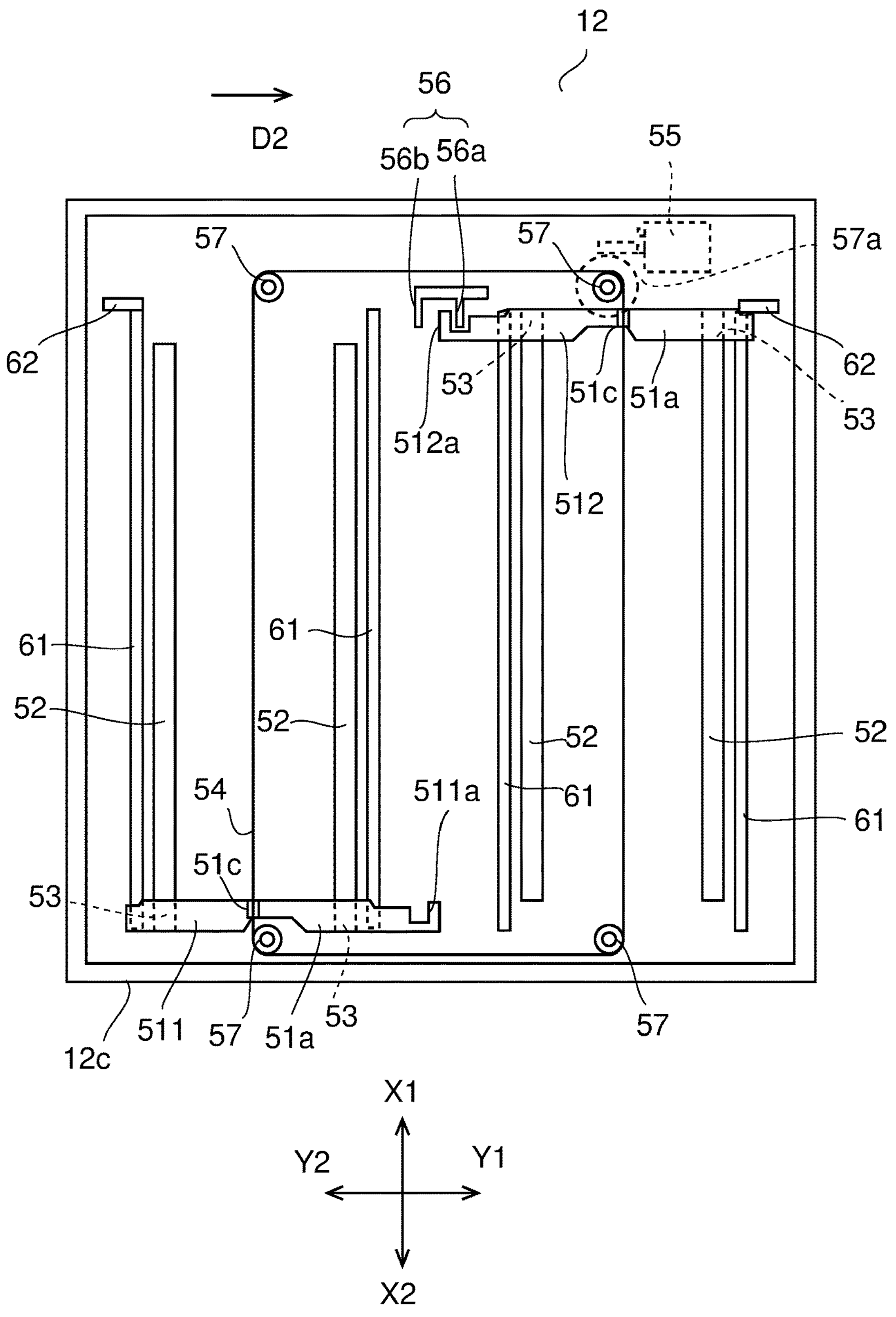
FIG. 7 is a plan view schematically showing an optical scanning device 12 according to one embodiment of the present disclosure.

Next, with reference to FIGS. 2 to 6, a description will be given of the optical scanning device 12. FIG. 2 is a perspective view of the optical scanning device 12. FIGS. 3 and 4 are perspective views each showing part of the optical scanning device 12 in an enlarged manner. FIG. 5 is a sectional view schematically showing part of the optical scanning device 12 as seen from a movement direction of a cleaning holder 511. FIGS. 6 and 7 are plan views schematically showing the optical scanning device 12.

In the drawings referred to below, an extending direction of the transmissive members 52 is referred to as direction X, X1 denoting one direction of the extending direction of the transmissive members 52 toward a detection portion 56, X2 denoting the other direction of the extending direction of the transmissive member 52 away from the detection portion 56. A juxtaposition direction of the transmissive members 52, in which the transmissive members 52 are disposed side by side with each other, is referred to as direction Y, Y1 denoting one direction of the juxtaposition direction of the transmissive members 52, Y2 denoting the other direction of the juxtaposition direction of the transmissive members 52. With reference to FIG. 2, in which the cleaning holder 511 and a cleaning holder 512 are illustrated to be on an upside with respect to the cover portion 12*c*, a description will be given of shapes of various portions and a positional relationship among them. Note that an up-down direction is a term used only for description, and does not limit a direction when the optical scanning device 12 is incorporated in the image forming apparatus 1.

Figure 10:
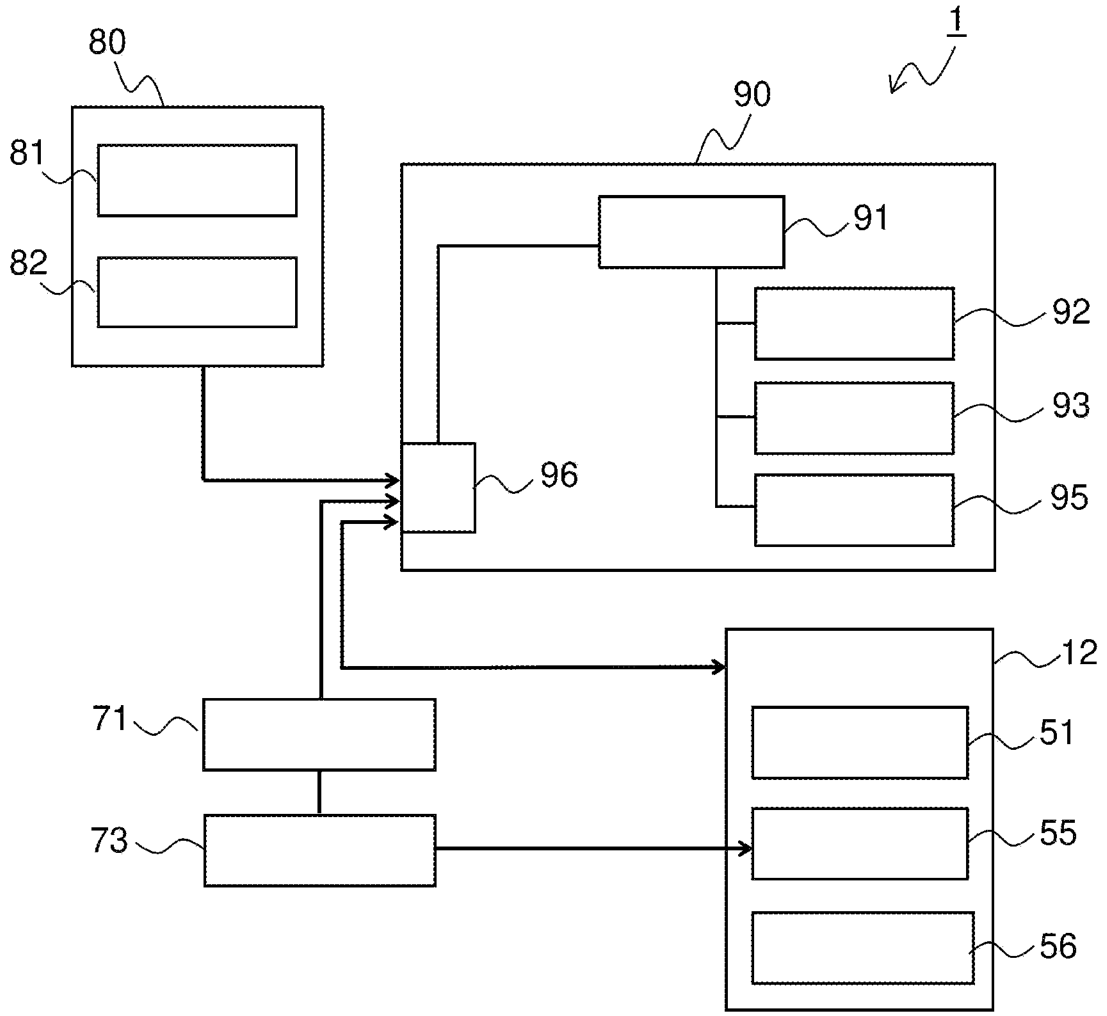
FIG. 10 is a block diagram showing one example of a control path used in an image forming apparatus 1 according to one embodiment of the present disclosure.

The optical scanning device 12 includes the casing 12*a*, the transmissive member 52, a wire-shaped member 54, a motor (driving portion) 55, a guide rail 61, a stopper 62, the cleaning holders 511 and 512, a cleaning member 53, the detection portion 56, and a control portion 90 (see FIG. 10).

The casing 12*a* includes the housing portion 12*b* and the cover portion 12*c* that is attached to the housing portion 12*b*, and in the cover portion 12*c*, four emission ports 12*d* for laser light are disposed side by side with each other so as to correspond to the four photosensitive drums 11*a* to 11*d*. Each of the emission ports 12*d* has a rectangular shape elongated in a main scanning direction of a corresponding ray of laser light (direction X), and the emission ports 12*d* are formed such that longitudinal directions thereof are parallel to each other.

The transmissive members 52 are rectangular plate-shaped, and each seal a corresponding one of the emission ports 12*d*. This helps prevent intrusion of toner, dust, and the like into the optical scanning device 12 via the emission ports 12*d*. The four transmissive members 52 are disposed side by side with each other such that their longitudinal directions (direction X) are parallel to each other. The transmissive members 52 are each a glass cover, for example.

The guide rail 61 includes a pair of guide rails 61 disposed on opposite sides of each pair of the transmissive members 52 with the each pair of the transmissive members 52 therebetween. In short, four guide rails 61 are disposed side by side with each other. The guide rails 61 protrude from an upper surface of the cover portion 12*c* and extend in the extending direction of the transmissive members 52 (in direction X). Each of the guide rails 61 has a guide rib 61*a* protruding outward from a leading end thereof to extend in the extending direction of the transmissive members 52 (in direction X) (see FIG. 5).

The stopper 62 is disposed on one side (an X1 side) of the guide rails 61 in an extending direction of the guide rails 61, and restricts movement of each of the cleaning holders 511 and 512 toward the one side (the X1 side) in the extending direction. The stopper 62 is fixed to the upper surface of the cover portion 12*c*. In the present embodiment, the stopper 62 includes two stoppers 62 disposed one on the one side of one guide rail 61 of each pair of the guide rails 61 astride which the cleaning holders 511 or 512 is disposed, and the stoppers 62 extend in the juxtaposition direction of the transmissive members 52 (in direction Y).

The cleaning holders 511 and 512 are disposed on the upper surface (the surface on the side of the photosensitive drums 11*a* to 11*d*) of the cover portion 12*c*, and each have a main body portion 51*a*, an engagement portion 51*b*, and respectively have light-blocking portions 511*a* and 512*a*. The main body portion 51*a* is formed in a plate shape, and extends in the juxtaposition direction of the transmissive members 52 (in direction Y) so as to be astride two adjacent ones of the transmissive members 52.

The cleaning member 53 is fixed to a lower surface of the main body portion 51*a* (see FIG. 5). The cleaning member 53 includes a pair of cleaning members 53 disposed inward of the engagement portion 51*b* in the juxtaposition direction (in direction Y). The cleaning members 53, along with the wire-shaped member 54 running in a loop, slide on the upper surfaces (the surfaces on the side of the photosensitive drums 11*a* to 11*d*) of the transmissive members 52. In this manner, the upper surfaces of the transmissive members 52 are simultaneously cleaned, each by a corresponding one of the cleaning members 53.

The cleaning members 53 are rubber pads, for example. Usable as a material of the rubber pads is a silicone rubber, for example. The cleaning holders 511 and 512 are each formed of a resin, for example. Note that the cleaning members 53 are not limited to the rubber pads, and may be made of, for example, a non-woven fabric.

The engagement portion 51*b* includes a pair of engagement portions 51*b* disposed on opposite sides across each pair of the guide rails 61. Each of the engagement portions 51*b* protrudes downward from a bottom surface of the main body portion 51*a*, and has its leading end bent toward one of the guide rails 61 to which it is adjacent. The engagement portions 51*b* engage with the guide ribs 61*a*. The cleaning holders 511 and 512 are each guided along a corresponding pair of the guide rails 61. This allows the cleaning holders 511 and 512 to move on the transmissive members 52 stably along the extending direction of the transmissive members 52 (in direction X).

Further, the engagement portions 51*b* engage with the guide ribs 61*a*, and thus opposite ends of the main body portion 51*a* are each latched on a corresponding one of the guide rails 61, in a direction (upward in FIG. 5) away from the casing 12*a* of the optical scanning device 12. In this manner, the cleaning holders 511 and 512 have their upward movements (positional deviation) restricted, and thus can be prevented from coming off from the cover portion 12*c*. Thus, the transmissive members 52 are allowed to be stably in close contact with the cleaning members 53.

Moreover, the other side (an X2 side) of each of the guide rails 61 in the extending direction thereof is open in the extending direction thereof (in direction X) (see FIGS. 6 and 7). This allows easy installation of the cleaning holders 511 and 512 on the guide rails 61 by bringing the engagement portions 51*b* into engagement with the guide ribs 61*a* from the other ends of the guide rails 61 in its extending direction and sliding the cleaning holders 511 and 512 toward the one side (the X1 side) in the extending direction of the guide rails 6. Thus, it is possible to improve assembly workability of the optical scanning device 12.

Note that the engagement portions 51*b* and the guide ribs 61*a* are just an example of the structure for engagement of the cleaning holders 511 and 512 with the cover portion 12*c*, and are not meant to limit the present disclosure.

The light-blocking portion 511*a* is disposed, in the cleaning holder 511, at a side end of the main body portion 51*a* on one side (a Y1 side) in the juxtaposition direction, so as to protrude in one direction (in direction X1) of the extending direction (see FIGS. 6 and 7). The light-blocking portion 512*a* is disposed, in the cleaning holder 512, at a side end of the main body portion 51*a* on the other side (a Y2 side) in the juxtaposition direction, so as to protrude in the one direction (in direction X1) of the extending direction (see FIGS. 6 and 7). Shapes of the light-blocking portions 511*a* and 512*a* will be described later in detail.

The main body portion 51*a* has a depressed portion 51*c* that is depressed downward from an upper surface of the main body portion 51*a*, and, in the depressed portion 51*c*, the wire-shaped member 54 is fitted. The depressed portion 51*c* has a protruding portion 51*d* protruding inward from an inner side surface of the depressed portion 51*c*, and by providing the protruding portion 51*d*, the wire-shaped member 54 is bent inside the depressed portion 51*c*. In this manner, the cleaning holders 511 and 512 are firmly fixed to the wire-shaped member 54. Note that the depressed portion 51*c* may instead be formed to be depressed upward from a lower surface of the main body portion 51*a*.

The wire-shaped member 54 can be a timing belt or a wire, for example. The wire-shaped member 54 is stretched in the casing 12*a* in a loop between four stretching pulleys 57 so as to pass between each adjacent two of the transmissive members 52. Between each adjacent two of the transmissive members 52, the wire-shaped member 54 extends parallel to the extending direction (direction X) of the transmissive members 52. The four stretching pulleys 57 are rotatably held on the upper surface of the cover portion 12*c*.

One of the stretching pulleys 57 is coupled to a gear 57*a* disposed on a lower surface of the cover portion 12*c* (see FIGS. 6 and 7). The gear 57*a* is coupled to the motor 55. The motor 55 causes the gear 57*a* to rotate to thereby cause the wire-shaped member 54 to run in a loop.

The motor (driving portion) 55 is disposed outward of the wire-shaped member 54, and is also fixed to the lower surface of the cover portion 12. That is, an upper end of the motor 55 is disposed below an upper end of the wire-shaped member 54. This makes is possible to reduce space on the upper surface of the cover portion 12*c*. By disposing the motor 55 outward of the wire-shaped member 54, it is possible to improve maintenance workability of the motor 55 and the gear 57*a*. The motor 55 is rotatable both forward and backward, and the motor 55 drives the wire-shaped member 54 to run in a loop clockwise (in direction D2) or counterclockwise (in direction D1) as seen from above (see FIGS. 6 and 7). As a result, the cleaning holders 511 and 512 reciprocate along a longitudinal direction of the transmissive members 52 (the main scanning direction of laser light). During their reciprocating movements, the cleaning holder 511 and the cleaning holder 512 linearly move in mutually opposite directions.

A cleaning process is executed in response to a user inputting process starting instructions via an operation portion 80 (see FIG. 10) or a host device such as a personal computer when the image forming apparatus 1 is in a maintenance mode. The cleaning process may also be executed periodically each time printing (image formation) is performed on about 10000 sheets, for example.

The detection portion 56 is disposed on the one side (the X1 side) in the extending direction of the transmissive members 52, and, in the juxtaposition direction (in direction Y) of the transmissive members 52, the detection portion 56 is disposed between movement paths of the cleaning holders 511 and 512 (see FIGS. 6 and 7). The detection portion 56 detects one of the cleaning holders 511 and 512 having reached one end of its moving path. Each of the cleaning holders 511 and 512 having reached the one end of its movement path comes into contact with a corresponding one of the stoppers 62, so that its movement toward the one side (the X1 side) in the extending direction is restricted.

The detection portion 56 is a sensor having a light emitting portion 56*a* and a light receiving portion 56*b*, and, with the single sensor, it is possible to detect that the cleaning holder 511 or 512 has reached the one end of its movement path. The light emitting portion 56*a* emits light in the juxtaposition direction of the transmissive members 52 (in direction Y). The light receiving portion 56*b* receives light emitted from the light emitting portion 56*a*. In the present embodiment, although the light emitting portion 56*a* is disposed more on the one side (the Y1 side) in the juxtaposition direction than the light receiving portion 56*b* is, the light emitting portion 56*a* may instead be disposed more on the other side (the Y2 side) in the juxtaposition direction than the light receiving portion 56*b* is.

Figure 8:
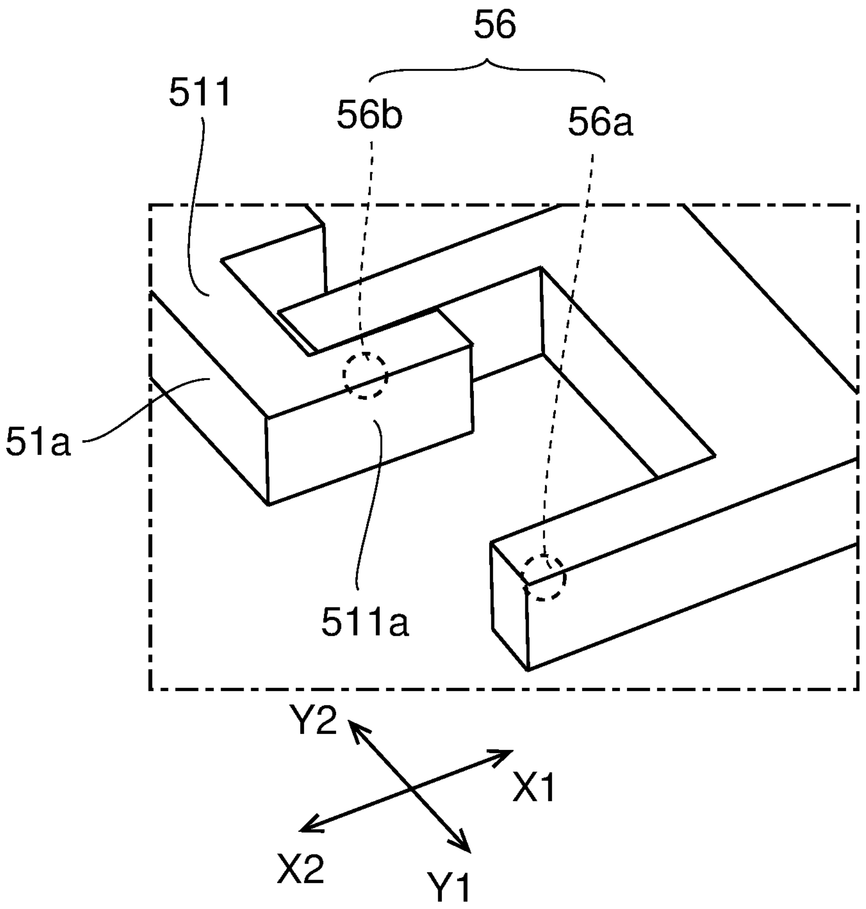
FIG. 8 is a perspective view schematically showing part of an optical scanning device 12 according to one embodiment of the present disclosure.
Figure 9:
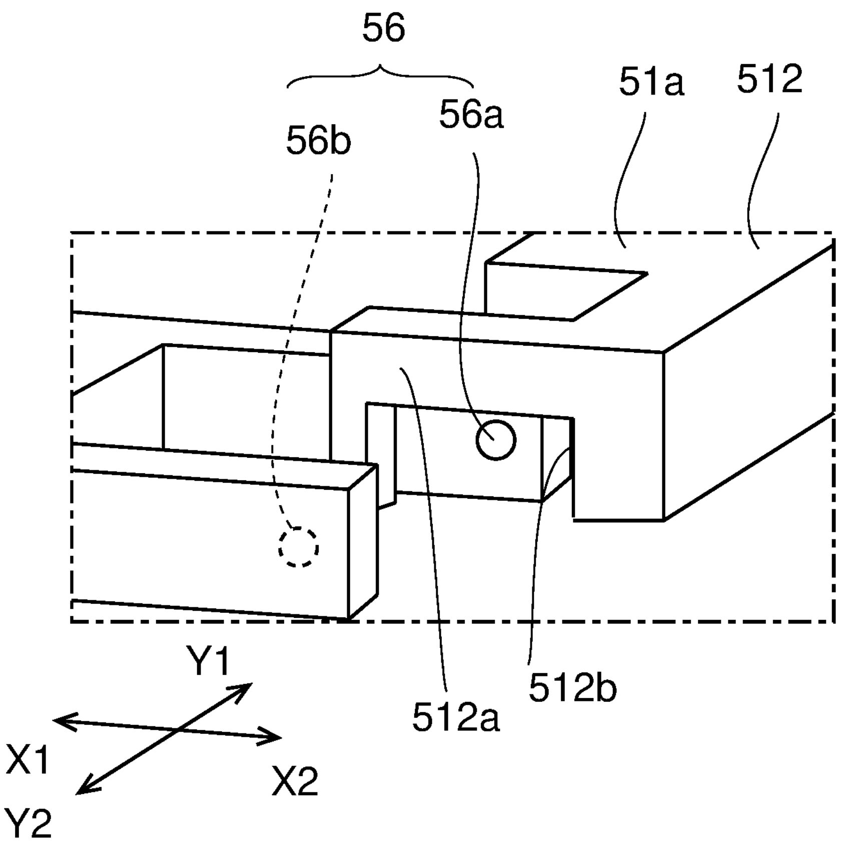
FIG. 9 is a perspective view schematically showing part of an optical scanning device 12 according to one embodiment of the present disclosure.

Next, with reference to FIGS. 8 and 9, a description will be given of the detection portion 56 and the light-blocking portions 511*a* and 512*a*. FIGS. 8 and 9 are perspective views schematically showing the detection portion 56 and the light-blocking portions 511*a* and 512*a*, FIG. 8 showing a relationship between the detection portion 56 and the light-blocking portion 511*a*, FIG. 9 showing a relationship between the detection portion 56 and the light-blocking portion 512*a*.

The light-blocking portion 511*a* and the light-blocking portion 512*a* have different shapes. In the present embodiment, the light-blocking portion 512*a* has formed therein a through hole 512*b* that penetrates the light-blocking portion 512*a* in the juxtaposition direction (in direction Y) (see FIG. 9), while the light-blocking portion 511*a* has no through hole 512*b* formed therein (see FIG. 8).

Thus, when the cleaning holder 511 or 512 reaches the one end of its movement path, depending on whether with the light-blocking portion 511*a* or with the light-blocking portion 511*a*, light that the light receiving portion 56*b* receives has different patterns.

Specifically, when a leading end of the light-blocking portion 511*a* moving toward the one side (the X1 side) in the extending direction is inserted between the light emitting portion 56*a* and the light receiving portion 56*b*, light emitted from the light emitting portion 56*a* is blocked by the leading end of the light-blocking portion 511*a*. As a result, the light receiving portion 56*b* is prevented from receiving the light emitted from the light emitting portion 56*a*. At this time, the detection portion 56 turns into an on state. Furthermore, by moving the light-blocking portion 511*a* toward the one side (the X1 side) in the extending direction, the cleaning holder 511 reaches the one end of its movement path and comes into contact with the stopper 62. As a result, the cleaning holder 511 is restricted in movement toward the one side (the X1 side) in the extending direction. At this time, the light emitted from the light emission portion 56*a* is blocked by the light-blocking portion 511*a*, and the detection portion 56 is kept in the on state (see FIG. 8).

On the other hand, when a leading end of the light-blocking portion 512*a* moving toward the one side (the X1 side) in the extending direction is inserted between the light emitting portion 56*a* and the light receiving portion 56*b*, the light emitted from the light emitting portion 56*a* is blocked by the leading end of the light-blocking portion 512*a*. As a result, the light receiving portion 56*b* is prevented from receiving the light emitted from the light emitting portion 56*a*. At this time, the detection portion 56 turns into the on state. Furthermore, by moving the light-blocking portion 512*a* toward the one side (the X1 side) in the extending direction, the cleaning holder 512 reaches the one end of its movement path and comes into contact with the stopper 62. As a result, the cleaning holder 512 is restricted in movement toward the one side (the X1 side) in the extending direction. At this time, the light emitted from the light emission portion 56*a* passes through the through hole 512*b* to be received by the light receiving portion 56*b*, and the detection portion 56 switches to an off state (see FIG. 9).

Thus, in a case where the on state of the detection portion 56 has been maintained for a predetermined time during execution of the cleaning mode, the detection portion 56 can detect that the cleaning holder 511 has reached the one end of its movement path. On the other hand, in a case where the detection portion 56 has switched to the off state after the on state thereof has been maintained for a predetermined time during execution of the cleaning mode, the detection portion 56 can detect that the cleaning holder 512 has reached the one end of its movement path. At this time, the wire-shaped member 54 stops running. That is, when one of the cleaning holders 511 and 512 reaches the one end of its movement path to have its movement restricted by the corresponding one of the stoppers 62, the other one of the cleaning holders 511 and 512 stops moving. As a result, the other one of the cleaning holders 511 and 512 can be prevented from coming off from the guide rails 61 on the other side (the X2 side) of the guide rails 61 in the extending direction thereof, the other side being open.

Next, referring back to FIGS. 6 and 7, a description will be given of an operation of the cleaning holder 511. In the present embodiment, as mentioned previously, in one execution of the cleaning process, along each of the transmissive members 52 in its extending direction (in direction X), a corresponding one of the cleaning members 53 reciprocates once. The description here will deal with a case where, during the cleaning process, a running direction of the wire-shaped member 54 changes from a direction (a first direction) indicated by an arrow D1 to a direction (a second direction) indicated by an arrow D2.

At a start of the cleaning process, the cleaning holder 511, at the one end of its movement path, holds the detection portion 56 in the on state (see FIG. 6). At a start of the execution of the cleaning mode, by setting the state where the cleaning holder 511 is disposed at the one end of its movement path as the initial position, the detection portion 56, in the on state, can detect the cleaning holder 511. This helps prevent occurrence of an initial error in the cleaning process.

When the cleaning process is started, the wire-shaped member 54 runs in the first direction indicated by the arrow D1 (see FIG. 6). Thereby, the cleaning holders 511 and 512 move from their respective positions shown in FIG. 6 to their respective positions shown in FIG. 7, and the detection portion 56 detects that the cleaning holder 512 has reached the one end of its movement path, so that the running of the wire-shaped member 54 is stopped. Thus, the cleaning holders 511 and 512 stop moving.

Next, the rotation direction of the motor 55 is reversed to cause the wire-shaped member 54 to run in the second direction (which is opposite to the first direction) indicated by the arrow D2 (see FIG. 7). As a result, the cleaning holders 511 and 512 move from their respective positions shown in FIG. 7 to their respective positions shown in FIG. 6, and the detection portion 56 detects that the cleaning holder 511 has reached the one end of its movement path, so that the running of the wire-shaped member 54 is stopped. Thus, the cleaning holders 511 and 512 stop operating. As to the execution of the cleaning mode, a detailed description will be given later.

FIG. 10 is a block diagram showing one example of a control path used in the image forming apparatus 1. During use of the image forming apparatus 1, various portions thereof are controlled in various manners, and this complicates the entire control path in the image forming apparatus 1. Thus, the following description will focus on such part of the control path as is necessary to implement the present disclosure.

A voltage control circuit 71 is connected to a motor driving power supply 73, and operates the motor driving power supply 73 based on an output signal from the control portion 90. Based on a control signal from the voltage control circuit 71, the motor driving power supply 73 applies a predetermined driving voltage to the motor 55 in the optical scanning device 12.

In the operation portion 80, there are provided a liquid crystal display portion 81 and LEDs 82 that indicate various types of states, and the operation portion 80 is configured to indicate the state of the image forming apparatus 1 and to display the condition of image formation or the number of sheets printed. Various settings for the image forming apparatus 1 are made via a printer driver of a personal computer.

The control portion 90 at least includes a CPU (central processing unit) 91 as a central processor, a ROM (read-only memory) 92 which is a read-only storage portion, a RAM (random access memory) 93 which is a readable/writable storage portion, a timer 95, and an OF (interface) 96 that transmits a control signal to various devices in the image forming apparatus 1 and receives an input signal from the operation portion 80.

The ROM 92 stores therein, for example, data that stays unchanged during use of the image forming apparatus 1, such as control programs for the image forming apparatus 1, numerical values necessary for controlling the image forming apparatus 1, etc. The RAM 93 stores therein, for example, necessary data generated during control of the image forming apparatus 1, data temporarily required for controlling the image forming apparatus 1, etc. During cleaning of the transmissive members 52 of the optical scanning device 12, the RAM 93 (or the ROM 92) further stores therein, for example, a voltage value (DUTY) applied to the motor 55 in each of later-described various operation modes of the cleaning holder 511, a driving time of the motor 55, etc. The timer 95 measures the driving time of the motor 55.

Figure 11:
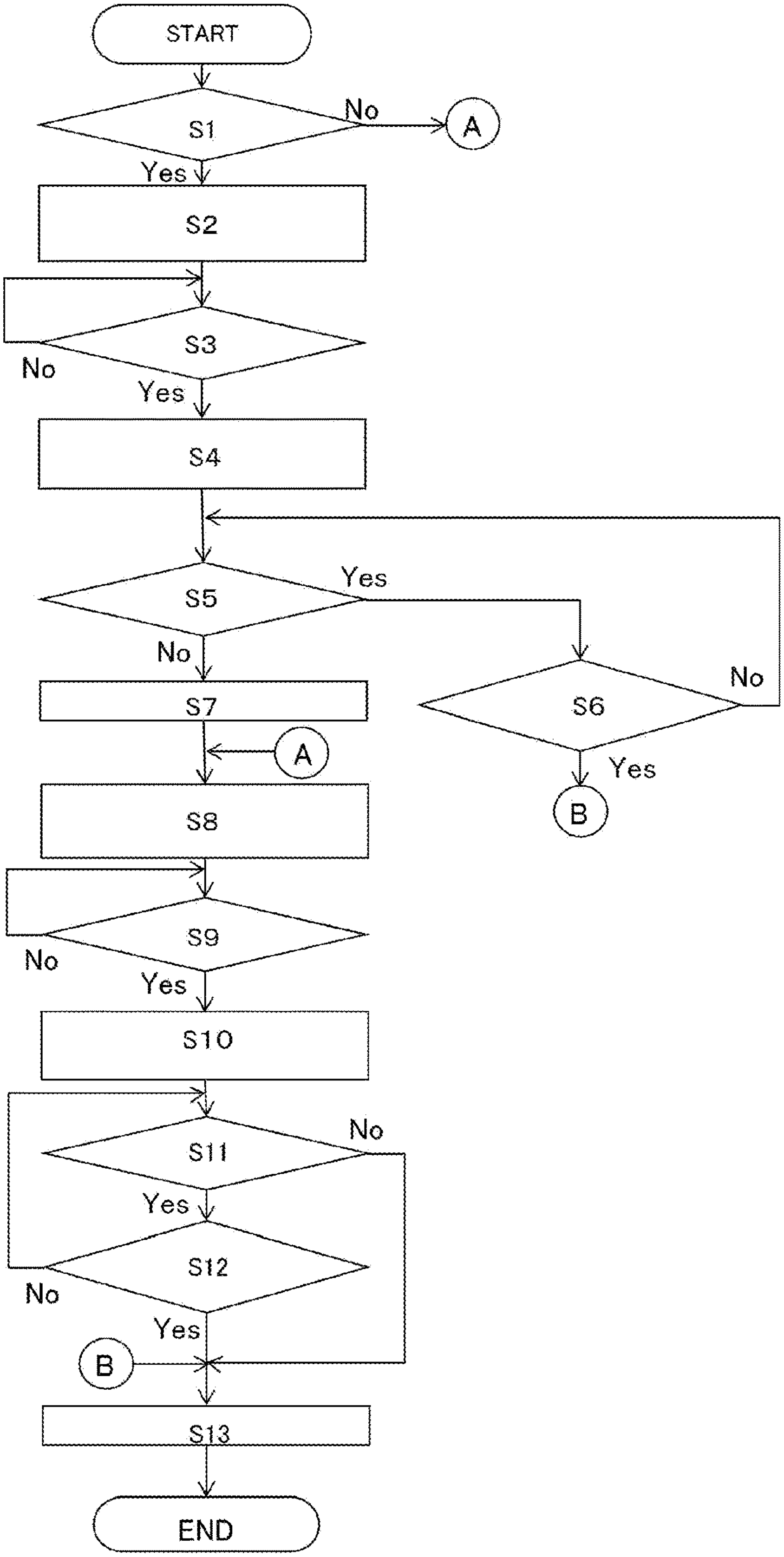
FIG. 11 is a flow chart showing a first control example of drive control of a motor 55 in a cleaning mode.

FIG. 11 is a flow chart showing a control example of drive control of the motor 55 in the cleaning mode. By referring to FIGS. 1 to 10 as necessary, a first control example of the motor 55 will be described following the steps shown in FIG. 11.

When the cleaning mode is started, the control portion 90 determines whether or not the detection portion 56 is in the on state (step S1). In a case where the detection portion 56 is in the on state (Yes in step S1), as shown in FIG. 6, the cleaning holder 511 is disposed at the initial position at the one end of its movement path, and the light-blocking portion 511*a* is inserted between the light emitting portion 56*a* and the light receiving portion 56*b* to block light emitted from the light emitting portion 56*a*. Thus, in the case where the detection portion 56 is in the on state in step S1, the control portion 90 determines that the cleaning holder 511 is at the initial position, and proceeds to step S2.

On the other hand, in a case where the detection portion 56 is in the off state (No in step S1), the control portion 90 determines that the cleaning holder 512 is disposed at the one end of its movement path, and proceeds to step S8. In step S8, a return operation is started.

That is, at the start of the execution of the cleaning mode, the control portion 90 determines which of the cleaning holders 511 and 512 is disposed at the one end of its movement path, by means of the detection portion 56, and then decides which of a forward operation and the return operation should be started. In this manner, whichever of the cleaning holders 511 and 512 may be disposed at the one end of its movement path on an end of the previous execution of the cleaning mode, the cleaning operation can be launched quickly.

In step S2, the control portion 90 causes the motor 55 to continue to rotate forward in a first operation mode M1. The control portion 90 transmits a control signal to the voltage control circuit 71, so that a driving voltage is supplied from the motor driving power supply 73 to the motor 55. As a result, the motor 55 is caused to rotate forward in the first operation mode M1 (an initial operation mode).

The forward rotation of the motor 55 causes the wire-shaped member 54 to run from the state shown in FIG. 6 in an arrow D1 direction, so that the cleaning holder 511 starts to move downward in FIG. 6, and the cleaning holder 512 starts to move upward in FIG. 6.

In step S3, the control portion 90 waits until the detection portion 56 turns into the on state. The downward movement of the cleaning holder 511 in FIG. 6 from the initial position causes the light-blocking portion 511*a* to be extracted from between the light emitting portion 56*a* and the light receiving portion 56*b*, so that the detection portion 56 turns into the off state. In a case where the detection portion 56 is in the off state (No in step S3), the motor 55 is caused to continue to rotate forward in the first operation mode M1.

On the other hand, in a case where the cleaning holder 512 has approached the one end of its movement path (see FIG. 7), the leading end of the light-blocking portion 512*a* is inserted between the light emitting portion 56*a* and the light receiving portion 56*b*, so that the detection portion 56 turns into the on state. At this time, the control portion 90 proceeds to step S4.

In step S4, the control portion 90 causes the motor 55 to start to rotate forward in a second operation mode M2. The motor 55 rotates at a lower rotational speed in the second operation mode M2 than in the first operation mode M1. In step S4, the light-blocking portion 512*a* is inserted further between the light emitting portion 56*a* and the light receiving portion 56*b*. Here, by making the rotational speed of the motor 55 in the second operation mode M2 lower than that in the first operation mode M1, the detection portion 56 can accurately detect the movement of the light-blocking portion 512*a*.

In step S5, it is determined whether or not the detection portion 56 is in the on state. The further insertion of the light-blocking portion 512*a* between the light emitting portion 56*a* and the light receiving portion 56*b* brings the through hole 512*b* to a position between the light emitting portion 56*a* and the light receiving portion 56*b*, so that the light emitted from the light emitting portion 56*a* passes through the through hole 512*b*. As a result, the light receiving portion 56*b* receives the light from the light emitting portion 56*a*, so that the detection portion 56 turns into the off state. At this time, the control portion 90 determines that the cleaning holder 512 is disposed at the one end of its movement path, and proceeds to step S7.

In step S7, the control portion 90 transmits a control signal to the voltage control circuit 71 to stop the forward rotation of the motor 55. The operations performed in the above-described steps S1 to S7 constitute the forward operation performed by the cleaning holders 511 and 512.

On the other hand, in a case where the detection portion 56 is in the on state in step S5, the control portion 90 proceeds to step S6 and determines whether or not a time T1 has passed. In a case where the time T1 has not passed yet, steps S5 and S6 are repeated and the motor 55 continues to be driven in the second operation mode M2 until the time T1 passes. At this time, the light-blocking portion 512*a* is inserted further between the light emitting portion 56*a* and the light receiving portion 56*b*.

In a case where the detection portion 56 is still in the on state when the time T1 has passed, the control portion 90 determines that an error has occurred in the movement of the cleaning holder 511 or of the cleaning holder 512, and proceeds to step S13. In step S13, the motor 55 is caused to stop operating, and the cleaning mode is finished. At this time, an error message is displayed on the liquid crystal display portion 81.

Next, the control portion 90 transmits a control signal to the voltage control circuit 71, so that a driving voltage is supplied from the motor driving power supply 73 to the motor As a result, the motor 55 is caused to rotate backward in the first operation mode M1 (step S8).

The backward rotation of the motor 55 causes the wire-shaped member 54 to run from the state shown in FIG. 7 in an arrow D2 direction, so that the cleaning holder 511 starts to move upward in FIG. 7, and the cleaning holder 512 starts to move downward in FIG. 7.

In step S9, the control portion 90 waits until the detection portion 56 turns into the on state. The downward movement of the cleaning holder 512 in FIG. 7 causes the light-blocking portion 512*a* to be extracted from between the light emitting portion 56*a* and the light receiving portion 56*b*, so that the detection portion 56 continues to be in the off state. In a case where the detection portion 56 is in the off state (No in step S9), the motor 55 continues to rotate backward in the first operation mode M1.

On the other hand, in a case where the cleaning holder 511 has approached the one end of its movement path (see FIG.

6), the leading end of the light-blocking portion 511*a* is inserted between the light emitting portion 56*a* and the light receiving portion 56*b*, so that the detection portion 56 turns into the on state. At this time, the control portion 90 proceeds to step S10.

In step S10, the control portion 90 causes the motor 55 to start to rotate backward in the second operation mode M2. The motor 55 rotates at a lower rotational speed in the second operation mode M2 than in the first operation mode M1. Here, by making the rotational speed of the motor 55 in the second operation mode M2 lower than that in the first operation mode M1, the detection portion 56 can accurately detect the movement of the light-blocking portion 511*a*.

In step S11, the control portion 90 determines whether or not the detection portion 56 is in the on state. Even in a case where the light-blocking portion 511*a* is inserted further between the light emitting portion 56*a* and the light receiving portion 56*b*, since the light-blocking portion 511*a* has no through hole 512*b* formed therein, the detection portion 56 is kept in the on state.

In a case where the detection portion 56 is in the on state in step S11, the control portion 90 proceeds to step S12 and determines whether or not the time T1 has passed. In a case where the time T1 has not passed yet, steps S11 and S12 are repeated and the motor 55 continues to be driven in the second operation mode M2 until the time T1 passes.

In a case where the detection portion 56 is still in the on state when the time T1 has passed, the control portion 90 determines that the cleaning holder 511 has reached the one end of its movement path, and proceeds to step S13. In step S13, the motor 55 is caused to stop operating, and the cleaning mode is finished.

On the other hand, in a case where the detection portion 56 has turned into the on state before the time T1 passes, the control portion 90 determines that an error has occurred in the movement of one of the cleaning holders 511 and 512, and proceeds to step S13. In step S13, the motor 55 is caused to stop operating, and the cleaning mode is finished. At this time, an error message is displayed on the liquid crystal display portion 81.

The operations performed in the above-described steps S8 to S13 constitute the return operation performed by the cleaning holders 511 and 512.

According to the present embodiment, the other side (the X2 side) of each of the guide rails 61 in the extending direction thereof is open in the extending direction thereof (in direction X) (see FIGS. 6 and 7). This allows easy installation of the cleaning holders 511 and 512 on the guide rails 61 by bringing each of the engagement portions 51*b* into engagement with the guide rib 61*a* from the other ends of the guide rails 61 in its extending direction and sliding the cleaning holders 511 and 512 toward the one side (the X1 side) in the extending direction of the guide rails 6. Thus, it is possible to improve assembly workability of the optical scanning device 12.

Further, the cleaning holders 511 and 512 each have the depressed portion 51*c* which is depressed in the up-down direction and which holds therein the wire-shaped member 54. The depressed portion 51*c* has fitted therein the wire-shaped member 54. Further, the depressed portion 51*c* has the protruding portion 51*d* protruding inward from the inner side surface of the depressed portion 51*c*, and by providing the protruding portion 51*d*, the wire-shaped member 54 is bent inside the depressed portion 51*c*. As a result, the cleaning holders 511 and 512 are firmly fixed to the wire-shaped member 54.

Moreover, the upper end of the motor 55 is disposed below the upper end of the wire-shaped member 54. With this arrangement, it is possible to reduce space on the upper surface of the cover portion 12*c*. Moreover, by disposing the motor 55 outward of the wire-shaped member 54, it is possible to improve maintenance workability of the motor 55 and the gear 57*a*.

Furthermore, when one of the cleaning holders 511 and 512 reaches the one end of its movement path so that its movement is restricted by the stopper 62, the other one of the cleaning holders 511 and 512 stops moving. As a result, the other one of the cleaning holders 511 and 512 can be prevented from coming off from the guide rails 61 on the other side (the X2 side) of the guide rails 61 in the extending direction thereof, the other side being open.

It should be understood that the embodiment described above is in no way meant to limit the present disclosure, which thus allows for many modifications and variations within the spirit of the present disclosure. For example, in the above embodiment, a tandem-type color printer is dealt with as an example of the image forming apparatus 1, but application of the present disclosure is not limited to color printers, and the present disclosure is applicable to other types of image forming apparatuses employing an electrophotographic method, such as color copiers, facsimile machines, etc.

The present disclosure is usable in optical scanning devices that irradiate an image carrier with light to form an electrostatic latent image. The use of the present disclosure makes it possible to provide an optical scanning device capable of suppressing stretch, break, and the like of a wire-shaped member caused by continuous application of a load to the wire-shaped member when a cleaning holder, which cleans a transmissive member that transmits laser light, is out of operation, and to provide an image forming apparatus including such an optical scanning device.

What is claimed is:

1. An optical scanning device that irradiates an image carrier with laser light to form an electrostatic latent image on the image carrier, the optical scanning device comprising:

a casing having an emission port for the laser light formed therein to extend in a main scanning direction of the laser light so as to correspond to the image carrier;

a transmissive member that has transmissivity with respect to the laser light, that extends in a main scanning direction of the laser light, and that seals the emission port for the laser light;

a wire-shaped member that is stretched in a loop in the casing;

a driving portion that causes the wire-shaped member to run in a first direction and in a second direction;

a guide rail disposed side by side with the emission port so as to extend in an extending direction of the transmissive member;

a cleaning holder that is fixed to the wire-shaped member and that moves along the guide rail when the wire-shaped member is caused to run in a loop by the driving portion;

a cleaning member that is fixed to the cleaning holder and that cleans the transmissive member by sliding with respect to the transmissive member along with movement of the cleaning holder; and a stopper that is disposed on one side of the guide rail in an extending direction of the guide rail and that restricts the movement of the cleaning holder, wherein an other side of the guide rail in the extending direction of the guide rail is open in the extending direction of the guide rail, and the cleaning holder has a depressed portion that is depressed in an up-down direction and that holds the wire-shaped member.

2. The optical scanning device according to claim 1, wherein the depressed portion has a protruding portion that protrudes inward from an inner side surface of the depressed portion.

3. The optical scanning device according to claim 1, wherein an upper end of the driving portion is disposed below an upper end of the wire-shaped portion.

4. The optical scanning device according to claim 3, wherein the driving portion is disposed outward of the wire-shaped member.

5. The optical scanning device according to claim 1, wherein the emission port includes four emission ports that are disposed side by side with each other and that are each sealed by the transmissive member, the guide rail includes two pairs of guide rails, the guide rails of each pair being disposed across corresponding two adjacent ones of the transmissive member from each other, the cleaning holder includes two cleaning holders that are disposed one astride corresponding two adjacent ones of the transmissive members such that opposite ends thereof are guided by the guide rails, and that move in mutually opposite directions, the stopper is disposed on one side of every two adjacent ones of the guide rails astride which one of the cleaning holders is disposed, and when one of the cleaning holders reaches one end of a movement path thereof and the movement thereof is restricted by the stopper, an other one of the cleaning holders stops moving.

6. An image forming apparatus, comprising:

one or more of the image carriers; and the optical scanning device according to claim 1 that irradiates the image carrier with laser light to form an electrostatic latent image on the image carrier.

* * * * *